(12) United States Patent
Ocegueda Gallaga et al.

(10) Patent No.: US 11,330,914 B2
(45) Date of Patent: May 17, 2022

(54) INTERNAL SUPPORT SYSTEM FOR AN INFLATABLE AIR MATTRESS

(71) Applicant: Belgravia Wood Limited, Tortola (VG)

(72) Inventors: Victor Hugo Ocegueda Gallaga, Baja California (MX); Chaolong Lan, Shenzhen (CN); Minglian Ma, Shenzhen (CN)

(73) Assignee: Belgravia Wood Limited, Road Town (VG)

( * ) Notice: Subject to any disclaimer, the term of this patent is extended or adjusted under 35 U.S.C. 154(b) by 19 days.

(21) Appl. No.: 16/718,963

(22) Filed: Dec. 18, 2019

(65) Prior Publication Data

US 2020/0187668 A1    Jun. 18, 2020

(51) Int. Cl.
*A47C 27/08* (2006.01)
*A47C 27/00* (2006.01)
*B29C 65/00* (2006.01)

(52) U.S. Cl.
CPC .......... *A47C 27/087* (2013.01); *A47C 27/083* (2013.01); *B29C 66/1122* (2013.01); *B29C 66/433* (2013.01); *B29C 66/4722* (2013.01); *A47C 27/081* (2013.01)

(58) Field of Classification Search
CPC ... A47C 27/087; A47C 27/083; A47C 27/081; B29C 66/1122; B29C 66/433; B29C 66/4722
USPC ..................................... 5/712, 711, 710, 706
See application file for complete search history.

(56) References Cited

U.S. PATENT DOCUMENTS

| 272,116 | A | * | 2/1883 | Blochman et al. | .. A47C 27/081 |
| | | | | | 5/712 |
| 277,979 | A | * | 5/1883 | Blochman et al. | .. A47C 27/081 |
| | | | | | 5/712 |
| 379,827 | A | | 3/1888 | Snavely et al. | |
| 539,621 | A | | 5/1895 | Jordan | |
| 679,680 | A | * | 7/1901 | Langer | ................. A47C 27/087 |
| | | | | | 5/696 |
| 684,554 | A | * | 10/1901 | Sawtell | ................ A47C 27/081 |
| | | | | | 5/712 |

(Continued)

FOREIGN PATENT DOCUMENTS

| CN | 2930467 Y | 8/2007 |
| CN | 201019353 Y | 2/2008 |

(Continued)

OTHER PUBLICATIONS

NPL Design U.S. Appl. No. 29/502,063, filed Sep. 11, 2014, entitled Inflatable Mattress, Allowed Apr. 27, 2016.

*Primary Examiner* — Robert G Santos
(74) *Attorney, Agent, or Firm* — Troutman Pepper Hamilton Sanders LLP; Ryan A. Schneider; Christopher C. Close, Jr.

(57) ABSTRACT

The disclosed technology includes an internal support structure for providing structural stability to an inflated air mattress. The internal support structure can include a loop of material and attachment strips to attach the loop to the top and bottom panels. The internal support structure can also include attachment strips to attach the ends of the loop of material together to complete the loop. The air mattress can include a plurality of internal support structures.

20 Claims, 8 Drawing Sheets

(56) References Cited

U.S. PATENT DOCUMENTS

| | | | |
|---|---|---|---|
| 811,407 A * | 1/1906 | Keil | A47C 27/087 5/655.3 |
| 1,706,560 A | 3/1929 | Carlson | |
| 3,045,303 A | 7/1962 | Wade | |
| 3,251,075 A | 5/1966 | Saltness et al. | |
| 3,683,431 A * | 8/1972 | Pennel | A47C 27/081 5/712 |
| 3,805,491 A | 4/1974 | Deal | |
| 4,181,990 A | 1/1980 | Santo | |
| 4,328,599 A * | 5/1982 | Mollura | A47C 27/085 5/682 |
| 4,349,926 A | 9/1982 | Winther | |
| 4,541,135 A | 9/1985 | Karpov | |
| 4,644,597 A | 2/1987 | Walker | |
| 4,700,419 A | 10/1987 | Santo | |
| 4,941,223 A | 7/1990 | Santo | |
| 5,452,487 A | 9/1995 | Leggett | |
| 5,490,295 A * | 2/1996 | Boyd | A47C 27/081 5/687 |
| 5,535,463 A | 7/1996 | Chiu | |
| 5,598,593 A | 2/1997 | Wolfe | |
| 5,608,931 A * | 3/1997 | Gancy | A47C 27/081 5/711 |
| 5,852,839 A * | 12/1998 | Gancy | A47C 27/087 5/706 |
| 5,960,495 A * | 10/1999 | Hsu | A47C 27/087 5/706 |
| 6,088,859 A | 7/2000 | Cavazos | |
| 6,463,610 B1 * | 10/2002 | Shulte | A47C 27/081 5/706 |
| 6,568,013 B2 | 5/2003 | Perez et al. | |
| 6,971,134 B2 * | 12/2005 | Wu | A47C 27/087 5/682 |
| 7,089,618 B1 | 8/2006 | Metzger | |
| 7,191,481 B2 * | 3/2007 | Hsu | A47C 27/081 5/712 |
| 7,322,064 B2 * | 1/2008 | Wu | A47C 27/081 5/706 |
| 7,337,485 B2 * | 3/2008 | Metzger | A47C 27/081 5/682 |
| 7,363,970 B2 | 4/2008 | Corre et al. | |
| 7,406,735 B2 * | 8/2008 | Lin | A47C 27/087 5/706 |
| 7,478,448 B2 | 1/2009 | Boso et al. | |
| 7,591,036 B2 * | 9/2009 | Lin | A47C 27/081 5/711 |
| 7,610,642 B2 | 11/2009 | Boyd | |
| 7,636,970 B2 * | 12/2009 | Lin | A47C 27/087 5/706 |
| 7,694,372 B1 * | 4/2010 | Boyd | A47C 27/081 5/712 |
| 8,234,728 B2 * | 8/2012 | Pittman | A47C 17/80 5/118 |
| 8,402,582 B2 * | 3/2013 | Xia | A47C 27/087 5/712 |
| 8,468,624 B2 * | 6/2013 | Pittman | B60P 7/16 5/118 |
| 8,562,773 B2 | 10/2013 | Lin et al. | |
| 8,826,477 B1 * | 9/2014 | Xia | A47C 27/087 5/712 |
| 9,156,203 B2 | 10/2015 | Lin et al. | |
| 9,247,827 B2 | 2/2016 | Lin et al. | |
| D765,443 S | 9/2016 | Lin et al. | |
| 10,631,659 B2 * | 4/2020 | Xia | B29C 65/04 |
| 10,687,633 B2 * | 6/2020 | Liu | A47C 27/081 |
| 10,945,533 B1 * | 3/2021 | Shi | A47C 27/087 |
| 2002/0189019 A1 * | 12/2002 | Schulte | A47C 27/087 5/712 |
| 2004/0074004 A1 | 4/2004 | Boso et al. | |
| 2005/0223495 A1 * | 10/2005 | Wu | A47C 27/087 5/711 |
| 2005/0229320 A1 * | 10/2005 | Wu | A47C 27/088 5/706 |
| 2005/0273938 A1 * | 12/2005 | Metzger | A47C 27/081 5/712 |
| 2006/0130240 A1 * | 6/2006 | Hsu | A47C 27/087 5/712 |
| 2007/0033739 A1 * | 2/2007 | Austen | A47C 27/081 5/712 |
| 2007/0044243 A1 | 3/2007 | Metzger | |
| 2007/0283499 A1 * | 12/2007 | Lin | A47C 27/081 5/712 |
| 2008/0105366 A1 * | 5/2008 | Wang | A47C 27/081 156/219 |
| 2008/0148489 A1 * | 6/2008 | Wu | A47C 27/081 5/712 |
| 2008/0209642 A1 * | 9/2008 | Lin | A47C 27/081 5/711 |
| 2008/0209643 A1 * | 9/2008 | Lin | A47C 27/081 5/711 |
| 2009/0165211 A1 | 7/2009 | Song et al. | |
| 2009/0320211 A1 | 12/2009 | Lau | |
| 2010/0235988 A1 * | 9/2010 | Pittman | A47C 21/048 5/119 |
| 2011/0191961 A1 * | 8/2011 | Wu | A47C 27/087 5/711 |
| 2012/0000017 A1 * | 1/2012 | Xia | A47C 27/081 5/706 |
| 2012/0272450 A1 * | 11/2012 | Pittman | A47C 21/048 5/119 |
| 2013/0228268 A1 | 9/2013 | Lin et al. | |
| 2013/0230670 A1 | 9/2013 | Lin et al. | |
| 2013/0230671 A1 | 9/2013 | Lin et al. | |
| 2014/0237727 A1 * | 8/2014 | Xia | A47C 27/087 5/711 |
| 2014/0265485 A1 | 9/2014 | Wang et al. | |
| 2014/0332139 A1 | 11/2014 | Lin et al. | |
| 2014/0332142 A1 | 11/2014 | Lin et al. | |
| 2015/0113736 A1 | 4/2015 | Cox et al. | |
| 2015/0201760 A1 | 7/2015 | Lin et al. | |
| 2015/0335164 A1 | 11/2015 | Liu | |
| 2017/0196368 A1 * | 7/2017 | Liu | A47C 27/16 |
| 2017/0238718 A1 * | 8/2017 | Xia | B29C 66/737 |

FOREIGN PATENT DOCUMENTS

| | | |
|---|---|---|
| CN | 201032956 Y | 3/2008 |
| CN | 201599174 U | 10/2010 |
| CN | 202243135 U | 5/2012 |
| CN | 102578859 A | 7/2012 |
| CN | 102578860 A | 7/2012 |
| CN | 102602598 A | 7/2012 |
| CN | 202536548 U | 11/2012 |
| CN | 202536827 U | 11/2012 |
| CN | 102990929 A | 3/2013 |
| CN | 103110297 A | 5/2013 |
| CN | 202919638 U | 5/2013 |
| CN | 203137718 U | 8/2013 |
| CN | 203137719 U | 8/2013 |
| CN | 203296407 U | 11/2013 |
| CN | 103600502 A | 2/2014 |
| CN | 204218433 U | 3/2014 |
| CN | 203735815 U | 7/2014 |
| CN | 203852092 U | 10/2014 |
| CN | 204232695 U | 4/2015 |
| CN | 204599945 U | 9/2015 |
| CN | 303354844 S | 9/2015 |
| DE | 102010022957 A1 | 12/2011 |
| FR | 1414259 A | 10/1965 |
| WO | 2013130117 A1 | 9/2013 |

* cited by examiner

INTERNAL SUPPORT SYSTEM FOR AN INFLATABLE AIR MATTRESS

CROSS-REFERENCE TO RELATED APPLICATIONS

This application claims the benefit, under 35 U.S.C. § 119(a), of Chinese Patent App. No. 2018221249624, filed 18 Dec. 2018, entitled "Internal Support System for an Inflatable Air Mattress," the entire contents and substance of which are incorporated herein by reference in its entirety.

TECHNICAL FIELD

Aspects of the present disclosure relate to systems and methods for providing internal support for an air mattress.

BACKGROUND

Inflatable air mattresses are often filled with air, and when a load is set atop an air mattress, such as a user sitting or lying on the air mattress, the load can cause an increase in the internal pressure of the air mattress. In turn, such an increase in internal pressure can cause the air mattress to deform or distort in shape, such as by causing the walls of the air mattress to bow outwards or cause the body of the air mattress to shear and slant in one or more directions. Such distortions can create a sense of imbalance that can affect a user's comfort level when, for example, attempting to sleep on the inflated air mattress. Accordingly, to increase structural stability, some air mattress designs include internal structures attempting to inhibit such distortions. Some inflatable air mattresses may include an internal support system that includes one or more separate chambers. However, including multiple chambers can increase the time associated with inflating or deflating the air mattress. Some inflatable air mattresses may attempt to solve this problem by including apertures in some of the components of the internal structure, such as a mesh material, for example. But the use of mesh material can cause difficulties during manufacturing, such as attaching the mesh material to other portions of the air mattress.

Thus, it would be desirable to develop an improved internal support structure for preventing the distortion of the shape of the inflated air mattress when in use.

BRIEF DESCRIPTION OF THE FIGURES

Reference will now be made to the accompanying figures, which are not necessarily drawn to scale, and wherein.

DETAILED DESCRIPTION

The present disclosure can be understood more readily by reference to the following detailed description of examples included herein. Before the examples of the devices and methods according to the present disclosure are disclosed and described, it is to be understood that disclosed technology is not limited to the specific examples described within this disclosure. Numerous modifications and variations therein will be apparent to those skilled in the art and remain within the scope of the disclosure. It is also to be understood that the terminology used herein is for the purpose of describing specific examples only and is not intended to be limiting. Some examples of the disclosed technology will be described more fully hereinafter with reference to the accompanying drawings. This disclosed technology can, however, be embodied in many different forms and should not be construed as limited to the examples set forth therein.

In the following description, numerous specific details are set forth. However, it is to be understood that examples of the disclosed technology may be practiced without these specific details. In other instances, well-known methods, structures, and techniques have not been shown in detail in order not to obscure an understanding of this description. References to "one example," "an example," "example embodiment," "some examples," "certain examples," "various examples," "one embodiment," "an embodiment," "some embodiment," "certain embodiment," "various embodiment," etc., indicate that the embodiment(s) or example(s) of the disclosed technology so described can include a particular feature, structure, or characteristic, but not every example necessarily includes the particular feature, structure, or characteristic. Further, repeated use of the phrase "in one example" does not necessarily refer to the same example, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing the examples, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the examples of the present disclosure, examples are explained hereinafter with reference to their implementation in an illustrative example. Such illustrative examples are not, however, intended to be limiting.

The materials described hereinafter as making up the various elements of the examples of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the invention, for example.

Examples of the disclosed technology include an inflatable air mattress having an internal support system for providing structural stability to the air mattress. In various examples, an inflatable air mattress having an internal support system can include one or more loops of material, and each loop of material can be attached to a top panel and a bottom panel of the air mattress. According to some examples, the internal support structure described herein can prevent distortions in the shape or orientation of the air mattress and add stability and support to the structure of the air mattress.

Throughout this disclosure, certain examples are described in exemplary fashion in relation to an inflatable air mattress. However, examples of the disclosed technology are not so limited. In some examples, the disclosed technique can be effective in other inflatable products such as inflatable pillows or inflatable supports.

Figure 1:
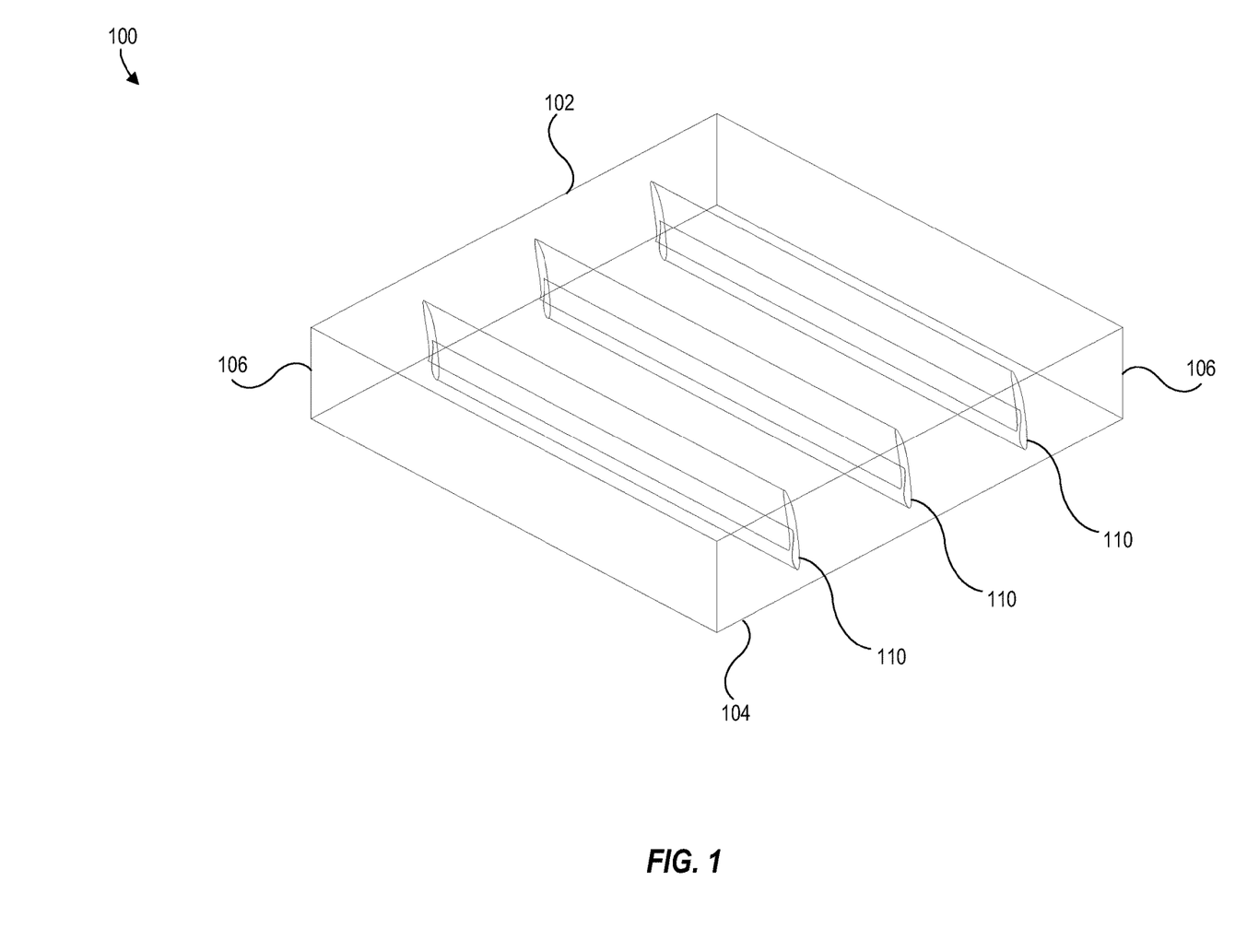
FIG. 1 illustrates a schematic diagram of an air mattress, in accordance with the disclosed technology.
Figure 2:
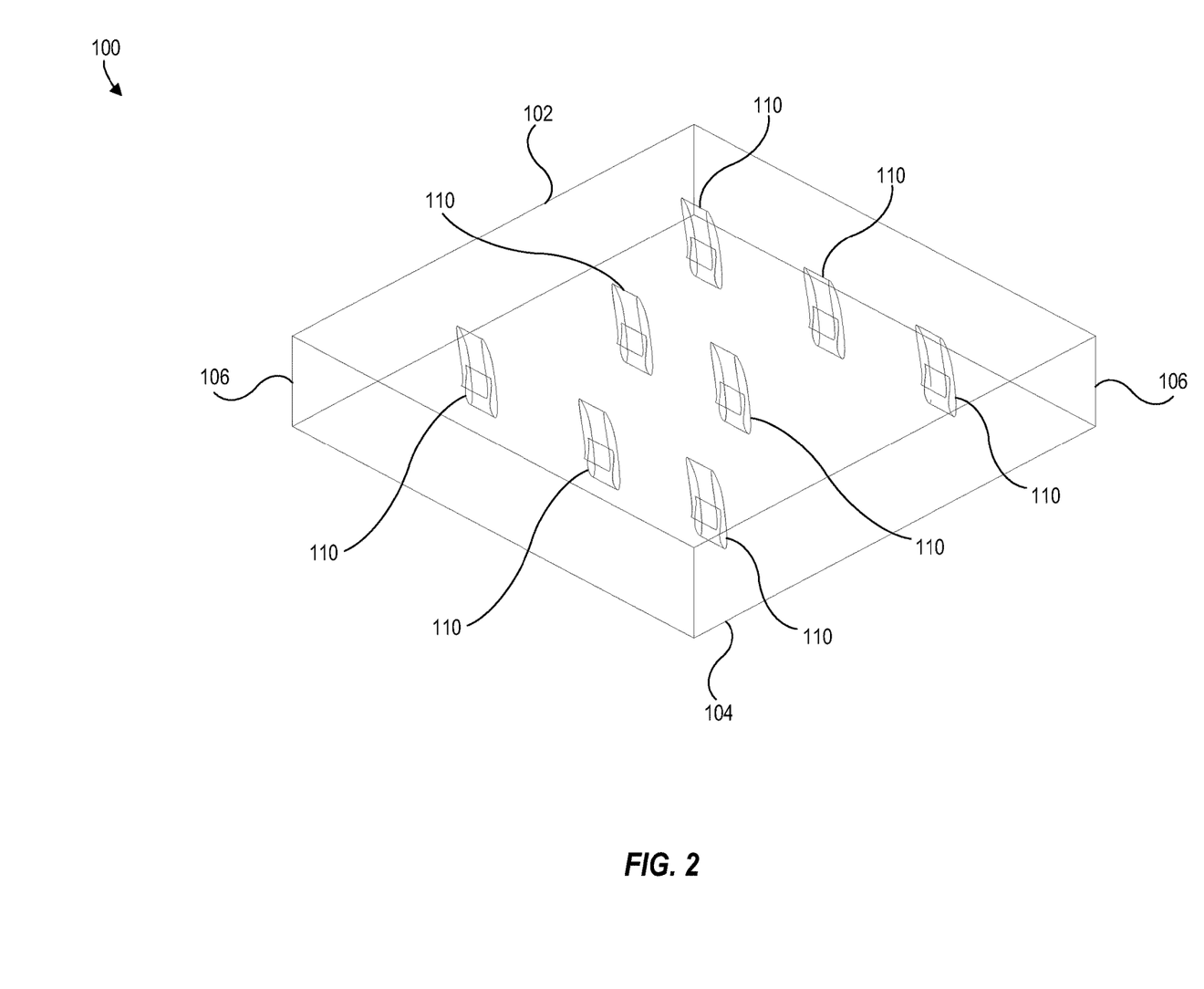
FIG. 2 illustrates a schematic diagram of an air mattress, in accordance with the disclosed technology.

Referring now to the drawings, FIGS. 1 and 2 illustrate an inflatable air mattress 100 having a top panel 102, a bottom panel 104, and one or more side panels 106 to form an airtight enclosure. The top panel 102, bottom panel 104, and one or more side panels 106 can be made of polypropylene, polyethylene, nylon, polyvinyl chloride ("PVC"), polytetrafluoroethylene ("PTFE"), plastic, rubber, or any other suitable material that is known in the art. The inflatable air mattress can be filled with air (or any gas) and used as a mattress, a pillow, or a cushion, for example. The inflatable air mattress 100 can include a valve through which air can be pumped into the internal chamber of the air mattress 100 or can be released from the internal chamber of the air mattress 100.

The inflatable air mattress 100 can include multiple internal support structures 110. The internal support structures 110 can extend across some of all of the width or length of the inflatable air mattress 100. For example, as shown in FIG. 1, the internal support structures 110 can extend across substantially all of the width or length of the air mattress 100. As shown in FIG. 2, the internal support structures 110 can have a width that is substantially less than the width or length of the air mattress 100. The air mattress 100 can include one or more internal support structures 110 of a first size (e.g., having a width that is substantially the same distance as the width or length of the air mattress 100) and one or more internal support structures 110 of a second size (e.g., having a width that is substantially smaller distance than the width or length of the air mattress). One or more internal support structures 110 can be positioned substantially parallel to the width or length of the air mattress 100 (e.g., parallel to one or more side panels 106). Additionally or alternatively, one or more internal support structures 110 can be positioned diagonally with respect to the width or length of the air mattress 100 (e.g., parallel to one or more side panels 106). Additionally or alternatively, one or more internal support structures 110 can be positioned diagonally with respect to one or more side walls 106.

Figure 3:
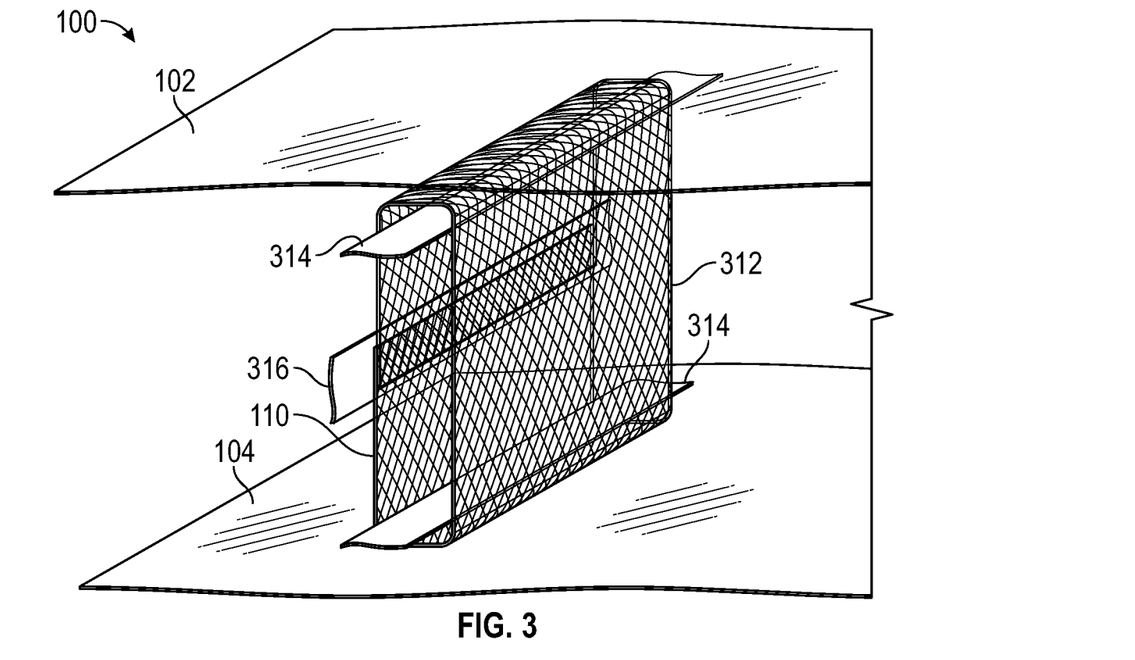
FIG. 3 illustrates an internal support structure of an air mattress, in accordance with the disclosed technology.
Figure 4:
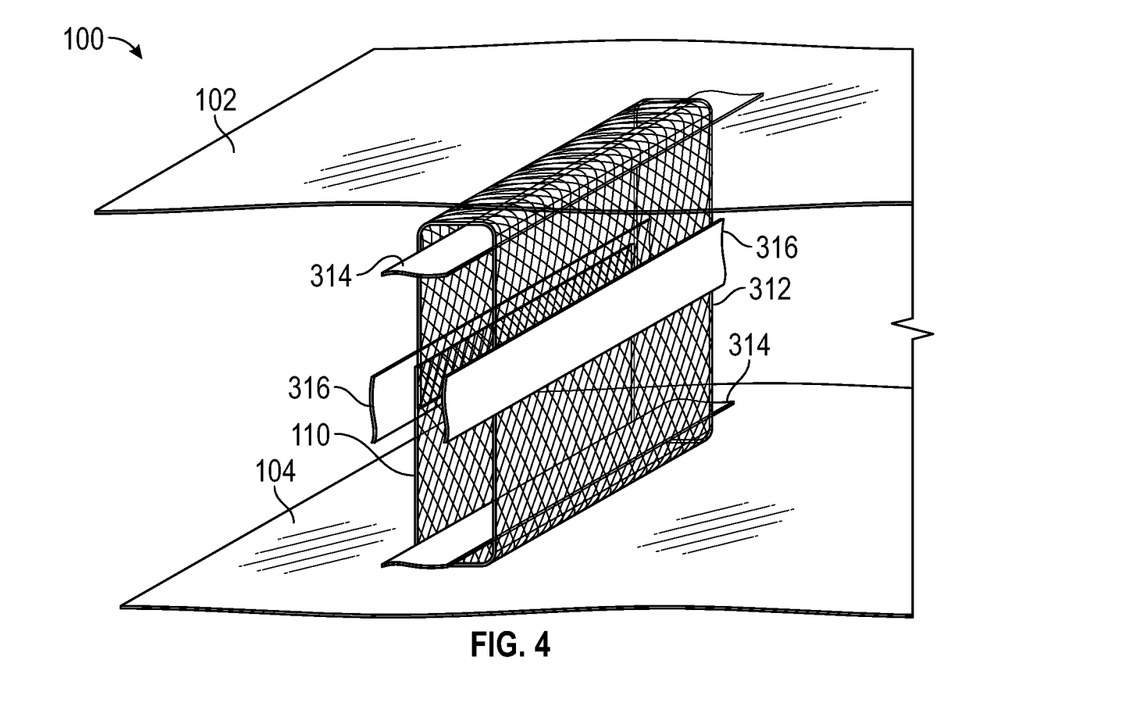
FIG. 4 illustrates an internal support structure of an air mattress, in accordance with the disclosed technology.
Figure 5:
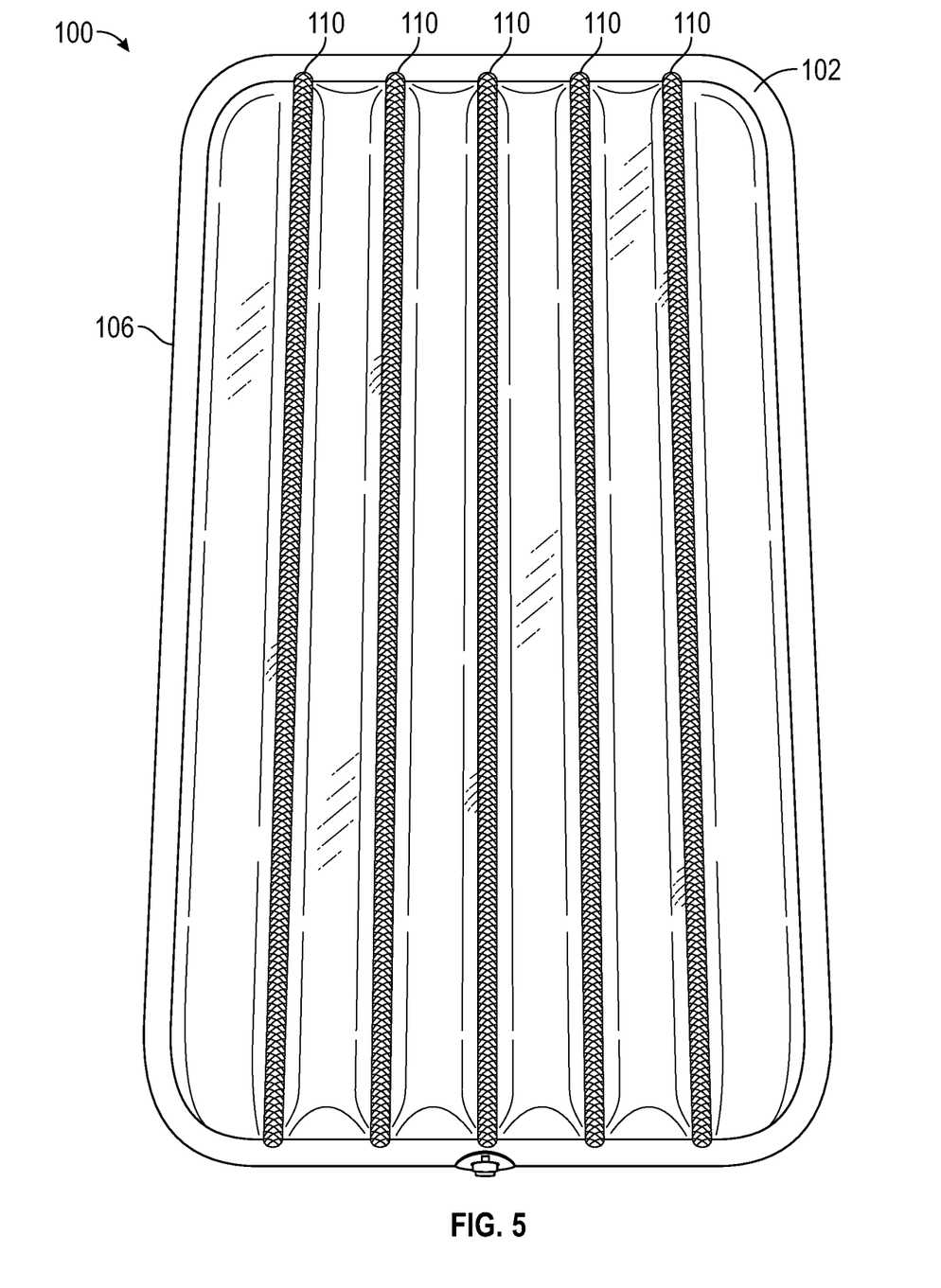
FIG. 5 illustrates a top view of an air mattress, in accordance with the disclosed technology.
Figure 6:
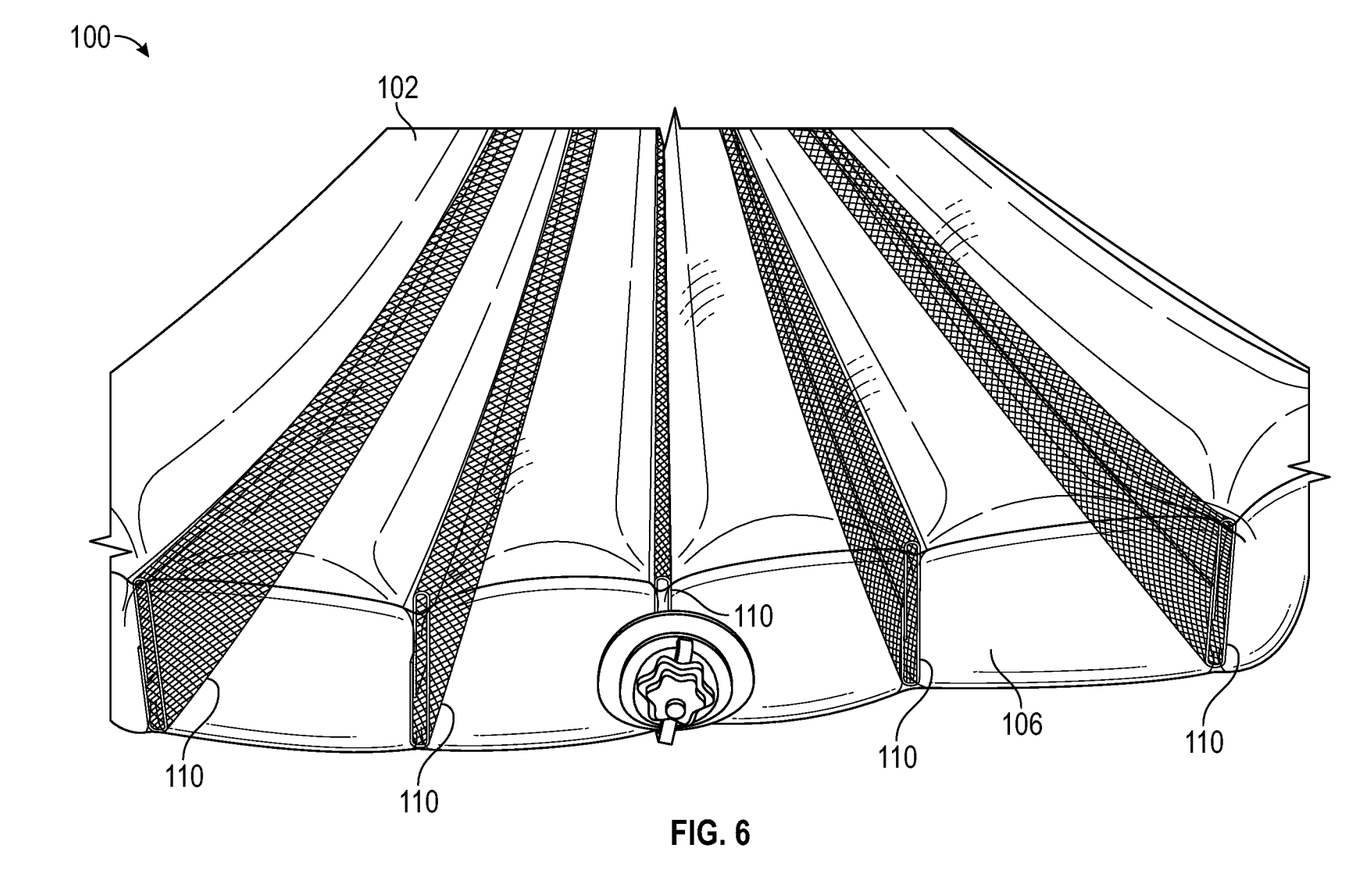
FIG. 6 illustrates a top-end view of an air mattress, in accordance with the disclosed technology.
Figure 7:
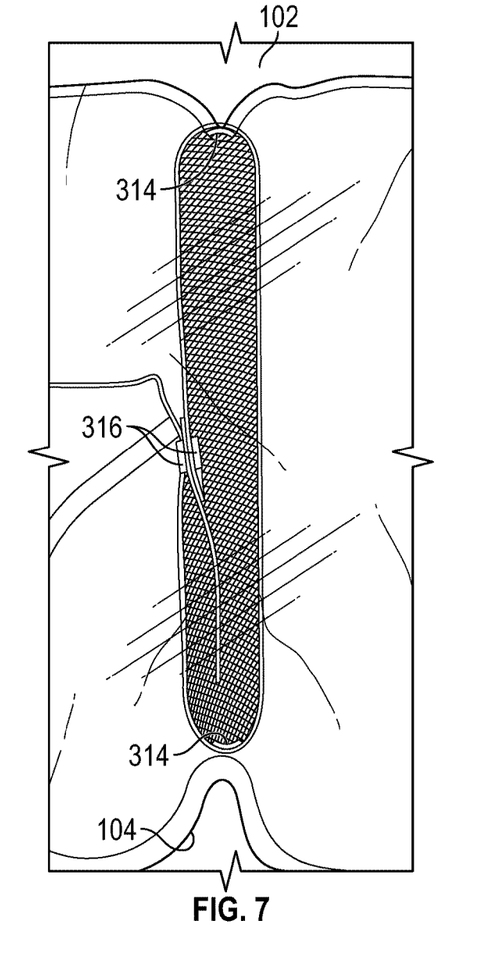
FIG. 7 illustrates an internal support structure of an air mattress, in accordance with the disclosed technology.
Figure 8:
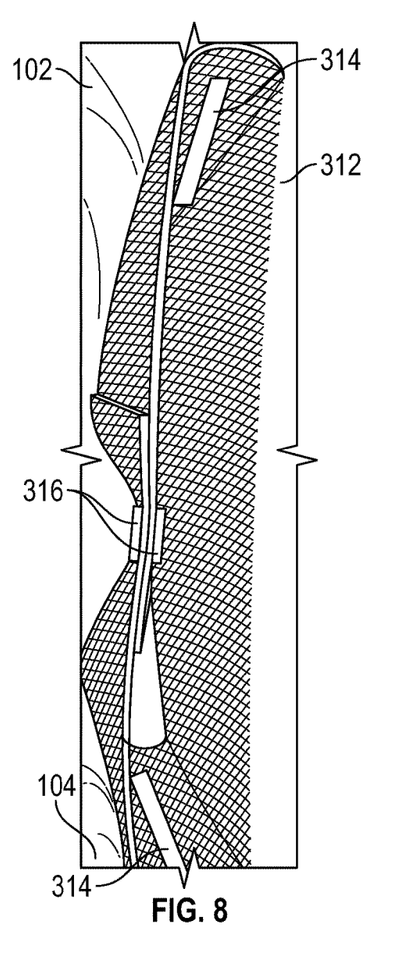
FIG. 8 illustrates an internal support structure of an air mattress, in accordance with the disclosed technology.
Figure 9:
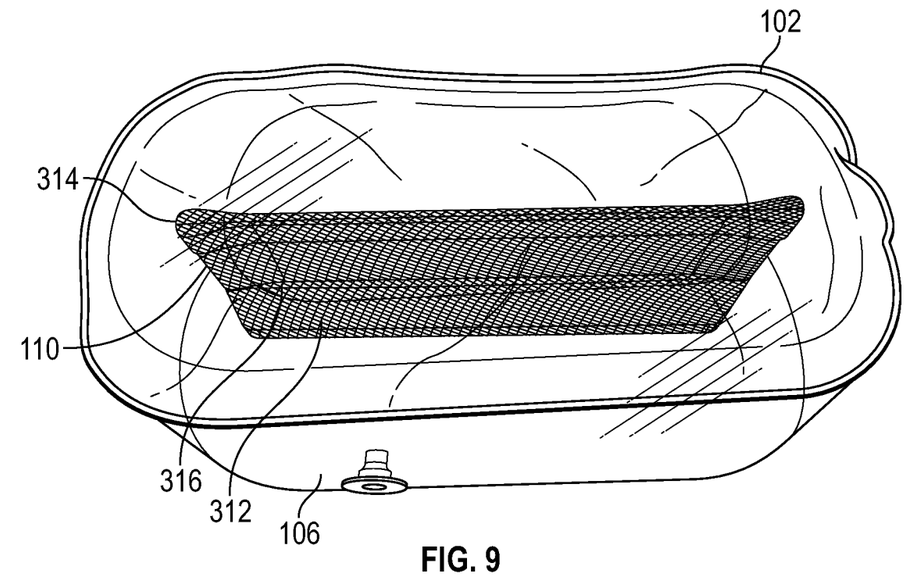
FIG. 9 illustrates an air cushion, in accordance with the disclosed technology.
Figure 10:
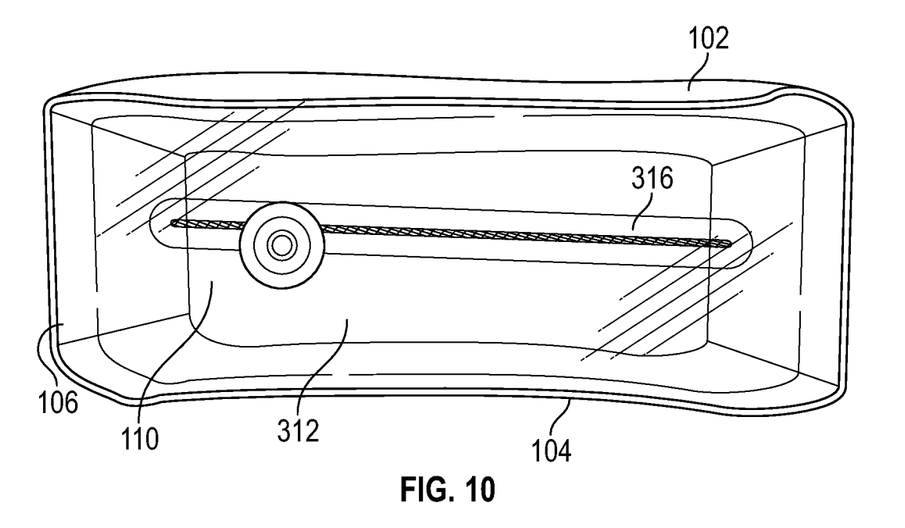
FIG. 10 illustrates a side view of an air cushion, in accordance with the disclosed technology.
Figure 11:
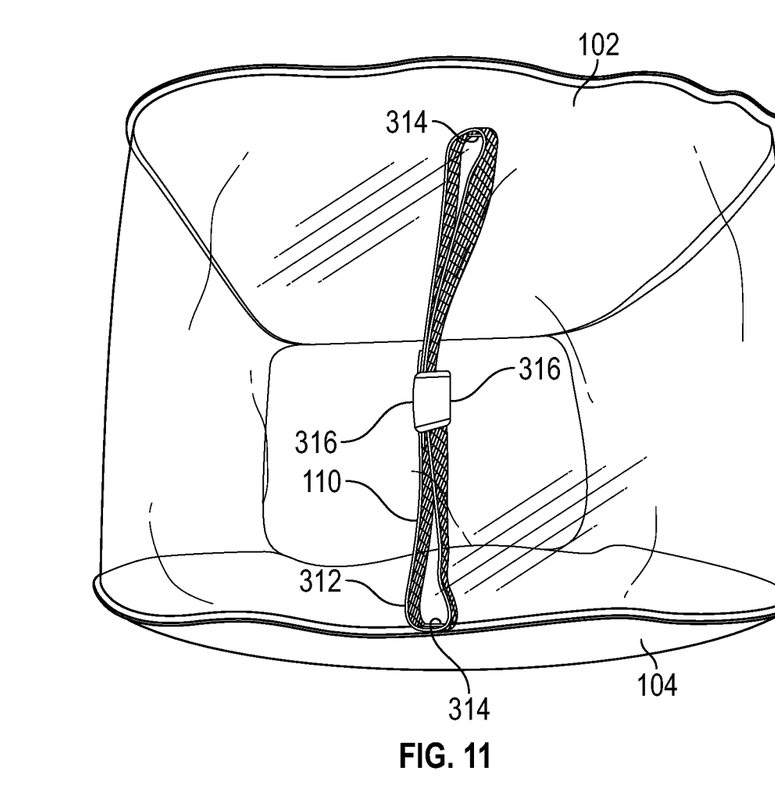
FIG. 11 illustrates an end view of an air cushion, in accordance with the disclosed technology.
Figure 12:
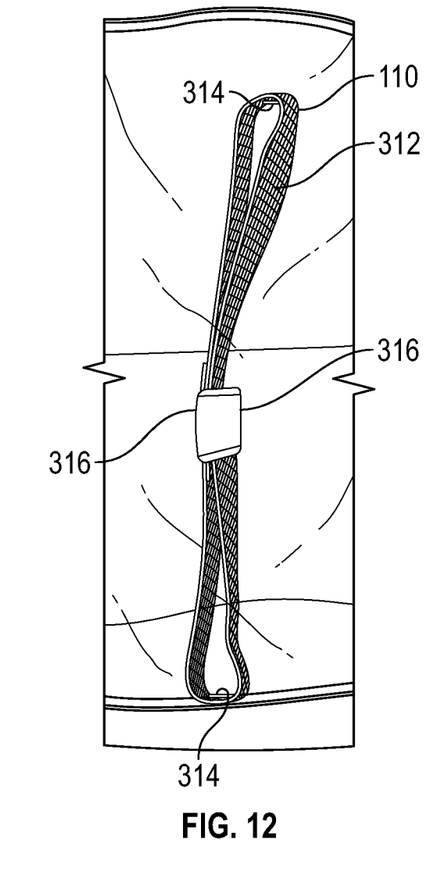
FIG. 12 illustrates an internal support structure of an air cushion, in accordance with the disclosed technology.

As shown more clearly in FIGS. 3 and 4, each internal support structure 110 can include a length of material that is wrapped in a loop 312. The loop 312 can be made from any suitable material, such as made of polypropylene, polyethylene, nylon, PVC, PTFE, plastic, or rubber, for example. The loop can be made from a material having apertures. For example, the loop 312 can made using a mesh material. Each internal support structure 110 can be attached to the top panel 102 and the bottom panel 104. Alternatively or in addition, one or more internal support structures 110 can be affixed to the internal surface of either the top panel 102 or bottom panel 104 by an attachment strip 314. An attachment strip 314 can be a piece of material (e.g., polypropylene, polyethylene, nylon, PVC, PTFE, plastic, rubber) that can be welded, glued, adhered, or otherwise attached to the internal surface of the top panel 102 or bottom panel 104 to secure a portion of the attachment strip 314 to the top panel 102 or bottom panel 104. A portion of the internal support structure 110 can be attached to one or more internal surfaces of a side panel 106, a portion of the internal support structure 110 can be attached to one or more adjacent internal support structures 110, and/or a portion of the internal support structure 110 can be attached to a side panel 106. For example, a portion of the internal support structure 110 can be attached to one or more adjacent internal support structures 110 and another portion of the internal support structure 110 can be attached to a side panel 106.

The loop 312 can have two ends that overlap one another. As shown in FIG. 3, an attachment strip or side strip 316 can be positioned proximate the overlapping ends of the loop 312. The side strip 316 can be a piece of material (e.g., polypropylene, polyethylene, nylon, PVC, PTFE, plastic, rubber). Alternatively, the side strip 316 can be the same material as the attachment strips 314. In other examples, the overlapping ends of the loop 312 can be welded, glued, adhered, or otherwise attached to the side strip 316.

The disclosed technology can include a loop 312 having two attachment strips 314 positioned within the loop 312 to affix the loop 312 to a top panel and a bottom panel 104, as well as one side strip 316 to secure the overlapping ends of the loop 312 to one another. The side strip 316 can be positioned outside the loop 312 and adjacent to the overlapping ends of the loop 312, the side strip 316 can be positioned within the loop 312 and adjacent to the overlapping ends of the loop 312, and/or the side strip 316 can be positioned between the overlapping ends of the loop 312.

The disclosed technology can include a second side strip 316. For example, a first side strip 316 can be positioned outside the loop 312 and adjacent the overlapping ends of the loop 312, and a second side strip can be positioned within the loop 312 and adjacent to the overlapping ends of the loop 312, as well as adjacent to the first side strip 316. That is, the overlapping ends of the loop 312 can be sandwiched between two side strips 316, and the two side strips 316 can be welded, glued, adhered, or otherwise attached one another such that the overlapping ends are secured.

In some examples, a side strip 316 may not be included. Instead, the overlapping ends of the loop 312 can be positioned proximate the top panel 102 or the bottom panel 104 such that an attachment strip 314 can simultaneously affix the loop 312 to the top or bottom panel 102, 104 and secure the overlapping ends of the loop 312 to one another. For example, an attachment strip 314 can be positioned within the loop 312 and adjacent to the overlapping ends of the loop 312, as well as adjacent to the top or bottom panel 102, 104. Alternatively or in addition, an attachment strip 314 can be positioned between the overlapping ends of the loop 312 and adjacent to the top or bottom panel 102, 104. Regardless of configuration (i.e., the attachment strip 314 being positioned within the loop 312 or between the overlapping ends of the loop 312), a second attachment strip 314 can be positioned within the loop 312 and opposite the first attachment strip 314 that is securing the overlapping ends of the loop 312 together such the second attachment strip 314 can secure the loop 312 to the top or bottom panel 102, 104 (i.e., the panel opposite the panel to which the first attachment strip 314 is securing the loop 312). Internal support structures 110 omitting a side strip 316 can be more difficult to manufacture as compared to internal support structures 110 including one or more side strips 316, but internal support structures 110 omitting a side strip 316 can enable an air mattress 100 to be constructed using less material.

Referring to FIG. 4, an internal support structure 110 can include two side strips 316. A portion of the loop 312 opposite the overlapping ends of the loop 312 can also be welded, glued, adhered, or otherwise attached to the side strip 316, which can cause the loop 312 to "pinch" together at the attachment point to the side strip 316 (i.e., the width of the loop 312 can decrease at or near the location that the loop 312 is attached to the side strip 316). A first side strip 316 can be positioned outside the loop 312 and adjacent the overlapping ends of the loop 312, and a second side strip 316 can be positioned outside the loop 312 and adjacent a portion of the loop 312 opposite the overlapping ends of the loop 312. Alternatively or in addition, a first side strip 316 can be positioned between the overlapping ends of the loop 312, and a second side strip 316 can be positioned outside the loop 312 and adjacent to a portion of the loop 312 opposite the overlapping ends of the loop 312. Regardless, the first and second side strips 316 can be welded, glued, adhered, or otherwise attached to one another, which can cause the overlapping ends of the loop to become secured together and can cause the width of the loop 312 to "pinch" together at or near the location of the first and second side strips 316.

An internal support structure 110 can "pinch" together while including only a single side strip 316. In some examples, the side strip 316 can be positioned outside the loop 312 and adjacent to the overlapping ends of the loop. The side strip 316 can be positioned outside the loop 312 and adjacent to a portion of the loop 312 opposite the overlapping ends of the loop 312. The side strip 316 can be positioned between the overlapping ends of the loop 312. Regardless, each of the overlapping ends, the portion of the loop 312 opposite the overlapping ends, and the side strip 316 can be welded, glued, adhered, or otherwise attached together.

The loop 312 can be made from a material that can be welded, glued, adhered, or otherwise attached to itself and/or welded, glued, adhered, or otherwise attached to the top panel 102, bottom panel 104, and/or side panel 106. Thus, an internal support structure 110 may not include an attachment strip 314 or a side strip 316 but can still be affixed to the top panel 102, bottom panel 104, side panel 106, and/or an adjacent internal support structure 110. Similarly, the overlapping ends of the loop can be secured directly to one another (i.e., without an attachment strip 314 or a side strip 316) by welding, gluing, adhering, or otherwise attaching the overlapping ends together. As will be appreciated, a "pinch" can be created by welding, gluing, adhering, or otherwise attaching the overlapping ends to a portion of the loop 312 opposite the overlapping ends.

FIGS. 5-12 depict various examples of the disclosed technology. For example, FIGS. 5-8 depict an air mattress 100 including five internal support structures 110 that extend along a large portion of the length of the air mattress 100. The disclosed technology (such as the example air mattress shown in FIGS. 5-8 and as most clearly shown in FIGS. 7 and 8) can include a first side strip 316 that can be positioned outside the loop 312 and proximate the overlapping ends of the loop 312, and a second side strip 316 that can be positioned within the loop 312 and proximate the overlapping ends. The first and second side strips 316 can then be welded, glued, adhered, or otherwise attached to one another, causing the overlapping ends to close the loop.

FIGS. 9-12 depict an air cushion representative of an air mattress, in accordance with some examples of the disclosed technology. The example air cushion depicted includes a single internal support structure 110, which includes a first side strip 316 positioned outside the loop 312 and proximate the overlapping ends and a second side strip 316 can be positioned outside the loop 312 and adjacent a portion of the loop 312 opposite the overlapping ends of the loop 312, as discussed above. As shown most clearly in FIGS. 11 and 12, attachment of the first side strip 316 to the second side strip 316 causes the loop 312 to "pinch" together at or near the first and second side strips 316. Though only a single support structure 110 is shown, it is understood that a plurality of similar support structures 110 could be used in an air mattress, according to the disclosed technology.

While certain examples of the disclosed technology have been described in connection with what is presently considered to be the most practical embodiments, it is to be understood that the disclosed technology is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain examples of the disclosed technology, including making and using any devices or systems and performing any incorporated methods. The patentable scope of certain examples of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. An inflatable air mattress comprising:
a top panel;
a bottom panel;
one or more side panels attached to the top panel and the bottom panel to form a substantially airtight enclosure;
a valve configured to control ingress and egress of air from the substantially airtight enclosure; and
an internal support structure including:
a length of material having a first end and a second end, the first end overlapping the second end to cause the length of material to form a loop having an internal surface and an external surface;
a first attachment strip positioned within the loop and attached to the top panel such that the external surface of the loop abuts an internal surface of the top panel;
a second attachment strip positioned within the loop and attached to the bottom panel such that the external surface of the loop abuts an internal surface of the bottom panel; and
a third attachment strip attached to the first end and the second end.

2. The inflatable air mattress of claim 1, wherein the third attachment strip is positioned outside the loop.

3. The inflatable air mattress of claim 1, wherein the third attachment strip is positioned within the loop.

4. The inflatable air mattress of claim 1 further comprising a fourth attachment strip positioned proximate the first and second ends and attached to the third attachment strip.

5. The inflatable air mattress of claim 4, wherein the fourth attachment strip is positioned within the loop.

6. The inflatable air mattress of claim 4, wherein the fourth attachment strip is positioned outside the loop and proximate a portion of the loop opposite the first and second ends.

7. The inflatable air mattress of claim 1 wherein the internal support structure is a first internal support structure and the inflatable air mattress further comprises a second internal support structure.

8. The inflatable air mattress of claim 7, wherein the loop of the first internal support structure is a first loop, the third attachment strip is positioned within the first loop, and a fourth attachment strip is positioned within a second loop of the second internal support structure, the fourth attachment strip being attached to the third attachment strip.

9. The inflatable air mattress of claim 1, wherein the length of material comprises a mesh material.

10. An inflatable air mattress comprising:
a top panel;
a bottom panel;
one or more side panels attached to the top panel and the bottom panel to form a substantially airtight enclosure;
a valve configured to control ingress and egress of air from the substantially airtight enclosure; and
an internal support structure including:
a length of material having a first end and a second end, the first end overlapping the second end to cause the length of material to form a loop having an internal surface and an external surface;
a first attachment strip positioned within the loop and attached to the top panel such that the external surface of the loop abuts an internal surface of the top panel;
a second attachment strip positioned within the loop and attached to the bottom panel such that the external surface of the loop abuts an internal surface of the bottom panel; and
a third attachment strip attaching the first end to the second end and attaching the loop to a side panel of the one or more side panels.

11. The inflatable air mattress of claim 10, wherein the length of material comprises a mesh material.

12. The inflatable air mattress of claim 10, wherein the internal support structure is a first internal support structure and the inflatable air mattress further comprises a second internal support structure.

13. A method for manufacturing an inflatable air mattress, the method comprising:
providing a first panel;
providing a second panel;
forming an internal support structure between the first and second panels by:
forming a loop with a length of material by causing a first end of the length of material to overlap a second end of the length of material, the loop having an internal surface and an external surface;
positioning a first attachment strip and a second attachment strip inside the loop;
attaching the first attachment strip to an internal surface of the first panel such that the external surface of the loop abuts the internal surface of the first panel;
attaching the second attachment strip to an internal surface of the second panel such that the external surface of the loop abuts the internal surface of the second panel;
attaching one or more side panels to the first panel and the second panel to form a substantially airtight enclosure; and
attaching a valve to the first panel, the second panel, or the one or more side panels, the valve being configured to control ingress and egress of air from the substantially airtight enclosure.

14. The method of claim 13, wherein (i) the first and second ends are adjacent the first panel and (ii) attaching the first attachment strip to the internal surface of the first panel comprises attaching the first and second ends to the internal surface of the first panel.

15. The method of claim 13 further comprising attaching the first end to the second end via a third attachment strip.

16. The method of claim 15 further comprising, prior to attaching the first end to the second end via the third attachment strip, positioning the third attachment strip outside the loop.

17. The method of claim 15 further comprising, prior to attaching the first end to the second end via the third attachment strip, positioning the third attachment strip within the loop.

18. The method of claim 15 further comprising attaching the first end to the second end via a third attachment strip and a fourth attachment strip, the third and fourth attachment strips being positioned such that at least one of the first end and the second end is disposed between the third and fourth attachment strips.

19. The method of claim 18, wherein the third attachment strip is positioned outside the loop and the fourth attachment strip is positioned within the loop.

20. The method of claim 18, wherein (i) the third attachment strip is positioned outside the loop proximate the first and second ends and (ii) the fourth attachment strip is positioned outside the loop and proximate a portion of the loop opposite the first and second ends.

* * * * *